F. S. CLARK.
SURVEYING INSTRUMENT.
APPLICATION FILED MAR. 15, 1917.
1,239,083.
Patented Sept. 4, 1917.
2 SHEETS—SHEET 1.
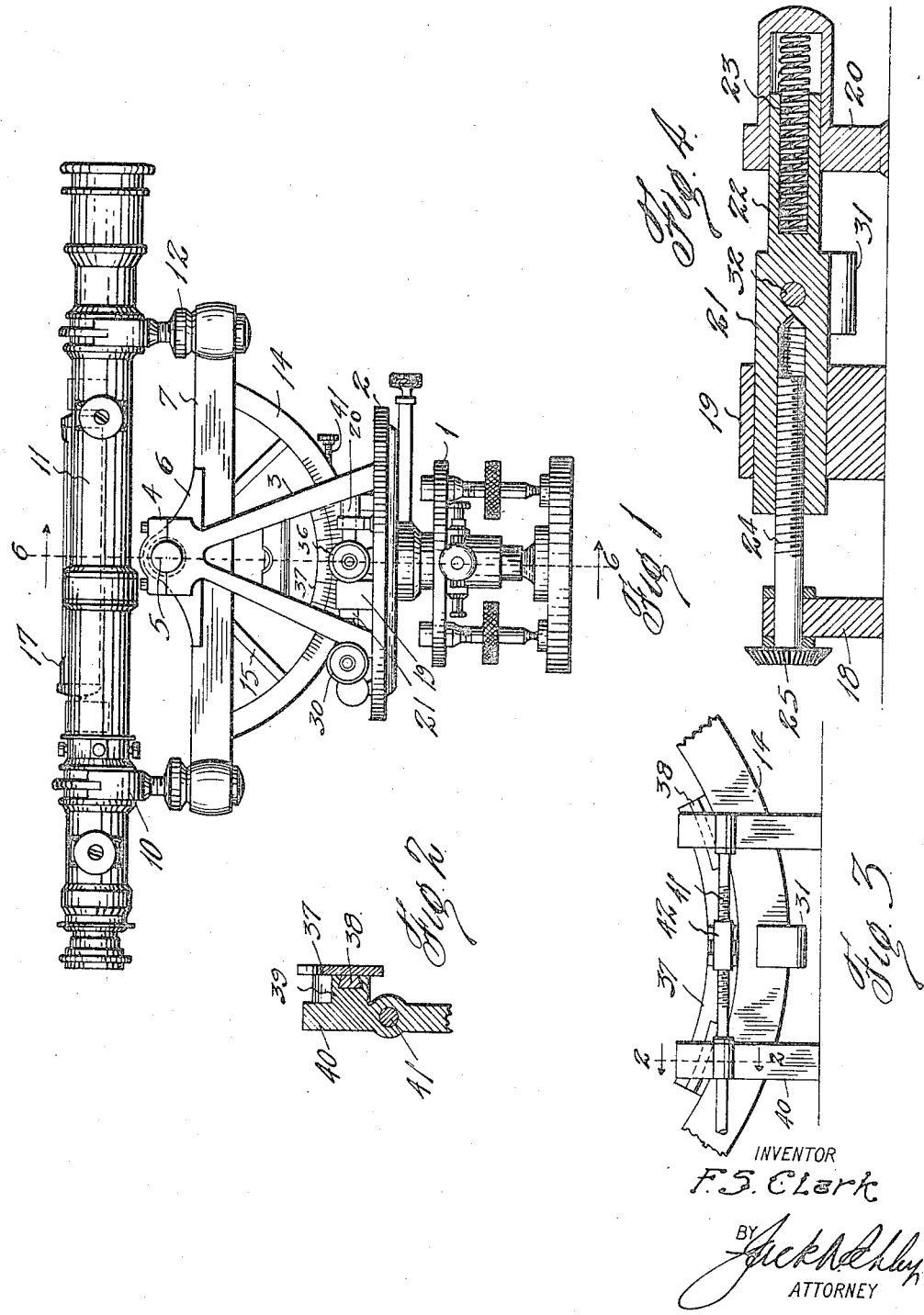
INVENTOR
F. S. Clark
BY
ATTORNEY

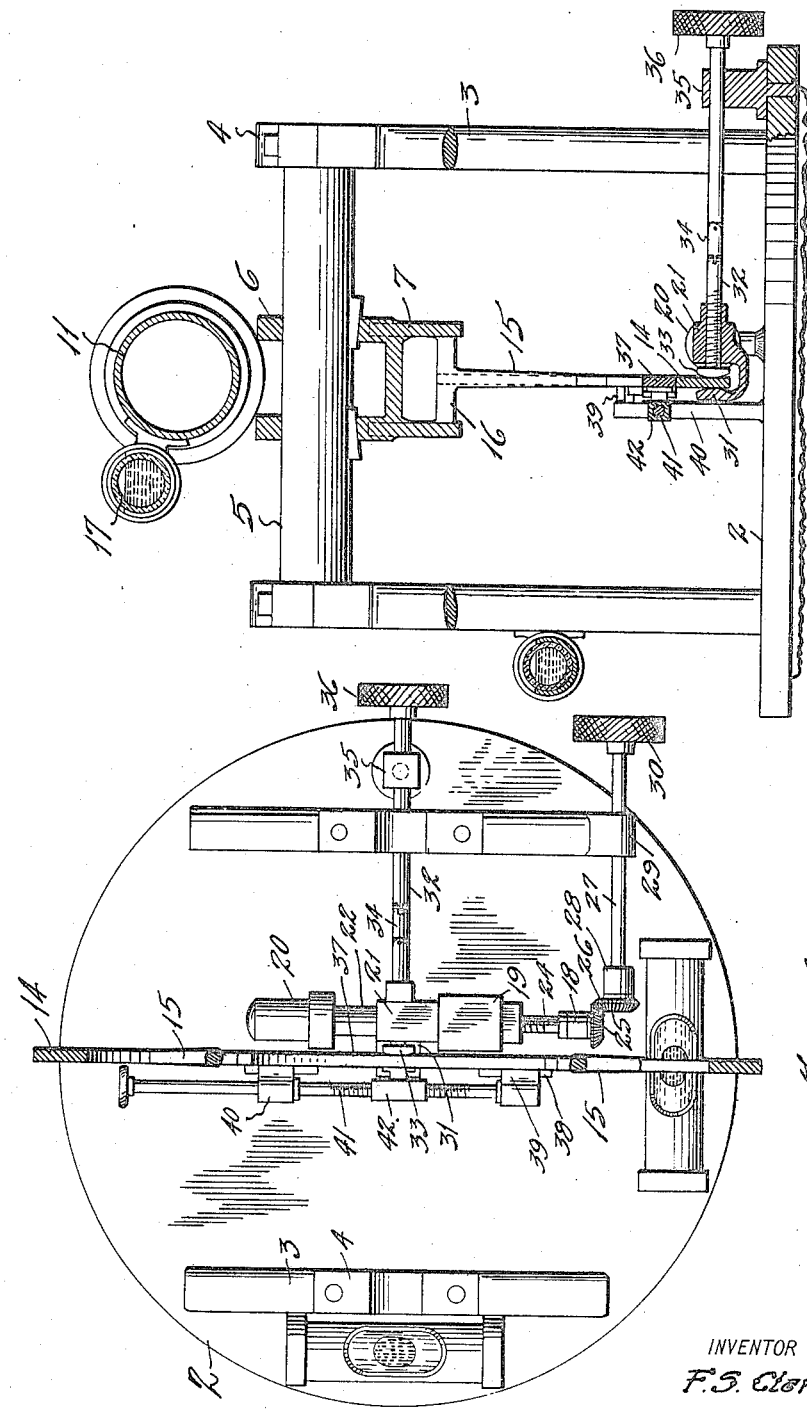

UNITED STATES PATENT OFFICE.

FRANKLIN S. CLARK, OF DALLAS, TEXAS.

SURVEYING INSTRUMENT.

1,239,083.  Specification of Letters Patent.  Patented Sept. 4, 1917.

Application filed March 15, 1917. Serial No. 155,000.

*To all whom it may concern:*

Be it known that I, FRANKLIN S. CLARK, a citizen of the United States, residing at Dallas, in the county of Dallas and State of Texas, have invented certain new and useful Improvements in Surveying Instruments, of which the following is a specification.

This invention has particular relation to that class of surveying and engineering instruments, known as levels and commonly referred to as Y levels.

Considerable experimenting has been done along the line of pivotally mounting the telescopes of levels. A serious objection to all such levels is that the telescopes of the same are not balanced and this is due to the relative location of the pivot point. Some have pivot points on each side of the telescope, while others have their pivots on each side of the supporting bar, frequently called "level" bar. The telescopes vary in length from twelve to twenty inches and the load sustained by the pivots is either all below or all above the axis of the pivots, which makes the telescope difficult to adjust accurately.

Furthermore it is quite difficult to rigidly fasten the telescope in its adjusted positions, especially where a long instrument is used. If the fastening is attempted by means disposed laterally of the telescope, there is a torsional axial strain to be overcome and I have found that the best results cannot be obtained by a lateral fastening.

My invention has for its essential feature the pivotal mounting and fastening of a level telescope in an efficient manner whereby the telescope is substantially balanced; this being accomplished by the proper location of the pivotal axis together with a rigid fastening in its adjusted positions by means of elements located substantially central with relation to the longitudinal axis of the telescope.

In carrying out the invention the transverse pivotal axis of the telescope is established relatively between the telescope and the supporting bar, with the result that the weight will be more equally distributed above and below the pivot point and the telescope substantially balanced. In order that the telescope and the supporting bar may be brought closer together the usual spirit level is removed from therebetween and otherwise mounted on the telescope.

While the supporting bar and telescope might be fastened in various manners I have found a very satisfactory arrangement to include a segment rigidly attached to the supporting bar and depending into a clamp mounted on the limb plate. The clamp fastens the segment so that the telescope and bar are immovable. By adjusting the clamp relatively tangential of the segment the telescope may be swung in a vertical plane as desired. The segment may be graduated like a vertical arc and a vernier provided. The fastening of the telescope is carried out on a line in substantially the same vertical plane as the longitudinal axis of the telescope so that all torsional strain is eliminated.

The invention will be more readily understood from a perusal of the following specification and by reference to the accompanying drawings, wherein an example of the invention is shown and in which:

Figure 1 is a side elevation of an engineer's level constructed in accordance with my invention, Fig. 2 is a cross-sectional detail on the line 2—2 of Fig. 3, Fig. 3 is a detail in elevation of the vernier and its support, Fig. 4 is a longitudinal sectional detail of the clamp and tangent fastening and adjusting device, Fig. 5 is a plan view, the supporting bar, its shaft and the telescope being omitted, and Fig. 6 is a transverse vertical sectional view taken on the line 6—6 of Fig. 1.

In the drawings the numeral 1 designates the usual leveling head on which is supported a limb or other supporting plate 2, according to the desires of the builder. A pair of spaced standards 3 are mounted on the plate as shown in the drawings. These standards have bearing boxes 4 at their upper ends receiving the reduced ends of a transverse shaft 5. At the central portion of the shaft a hanger 6 is rigidly fastened thereon and at right angles thereto. This hanger suspends an inverted channel bar 7, referred to herein as the supporting bar. This bar extends equally on each side of the shaft and at right angles thereto. The supporting bar is thus suspended between the standards 3 and is capable of oscillation in a vertical arc of approximately 70 degrees.

Mounted at either end of the bar 7 is a yoke member 10, said members being substantially Y-shaped and each being commonly known as a Y. These members support the usual telescope 11 which is mounted in the usual manner, leveling nuts 12 being mounted on the members 10. As the invention relates to the pivotal mounting of the bar 7 and the telescope together with means for fastening the same in the positions to which they are oscillated, no attempt will be made to describe the details of the other parts of the instrument which may be of any approved type and form.

Co-incident with the vertical plane in which the longitudinal axes of both the telescope and the bar 7, lie is a depending vertical segment 14. This segment has its upper ends secured in the channel of the bar and is additionally supported by divergent braces 15 also secured in the channel. These parts may be cast integral with the bar by means of webs 16, or they may be otherwise suitably fastened to the bar in a rigid manner. It will be seen that the longitudinal axis of the shaft 5 passes between the telescope and the supporting bar and thus the weight is distributed above and below the pivotal axis of said parts, whereby a more perfect balance is had and the oscillation of the telescope is more readily carried out. By suspending the segment in the center and balancing the telescope it is obvious that the latter may be easily adjusted by oscillating the segment. A spirit level 17 is mounted on the side of the telescope and by omitting this level from between the bar and telescope, said parts may be brought closer together.

By uniting the telescope, supporting bar and segment in substantially rigid relation to each other, it will be obvious that by rigidly fastening the segment the telescope is also rigidly fastened. It is equally obvious that other ways of fastening might be used. I mount on the plate 2 a pair of brackets 18 and 19 respectively, together with a cap-bracket 20. These brackets are disposed in a line parallel to the bar 7 and at one side of the segment. An elongated clamp-member 21, square in cross-section, is mounted to slide in the bracket 19 and is provided with a cylindrical barrel 22 slidably engaging in the cap-bracket 20. The barrel receives a coiled spring 23 which tends to force the barrel from the cap-bracket. The opposite end of the member is internally screw-threaded to receive a tangent adjusting screw 24 which is rotatably confined in the bracket 18. By revolving the screw the clamp member is longitudinally adjusted. On the outer end of the screw a bevel pinion 25 is mounted and meshes with a similar pinion 26 fixed on the inner end of a shaft 27 disposed at substantially right angles to the screw. This shaft is mounted in a bracket 28 at its inner end and also in a bracket 29 projecting from one of the standards. The outer end of the shaft projects beyond the margin of the plate 2 and has a thumb wheel 30 thereon.

The inner end of the squared portion of the clamp member 21 is at the central portion of the plate 2 and carries a laterally projecting clamp jaw 31 into which the segment depends. A clamp screw-shaft 32 is threaded through the member 21 at right angles thereto and has a clamp-head 33 adapted to bind on the segment in opposed relation to the top of the jaw. By tightening the screw-shaft so that its head binds the segment in the jaw, said segment is rigidly secured against further arcuate movement, unless the member 21 is adjusted. The screw-shaft includes a universal joint 34 and is slidably mounted in a bracket 35 swiveled on the marginal portion of the plate 2. A thumb wheel 36 is mounted on the outer end of the screw-shaft.

The segment has one face provided with graduations which may be registered with graduations on the face of a vernier 37 in contact with the inner periphery of the segment. The vernier is provided with concentric lugs 38 slidable in sockets 39 projecting from standards 40 mounted on the plate 2. An adjusting screw 41 is mounted in the said brackets and has a sleeve 42 engaging its threaded portion and loosely connected with the vernier. By revolving the said screw the sleeve is moved longitudinally, and the vernier given an adjustment concentric to the segment.

It will be readily seen that by loosening the clamp screw-shaft 32 the segment is freed and may, with the telescope and supporting bar be oscillated quickly throughout the full amplitude of its possible movement. Likewise the telescope may be rigidly fastened in any adjusted position by tightening up said screw-shaft. With the segment clamped in any position it might be necessary or desirable to further adjust the telescope and this may be readily accomplished by means of the tangential adjusting screw 24 which bodily moves the member 21 carrying the clamp 31 and head 33. Through the graduations of the segment and the vernier and their adjustments all the functions of the usual vertical arc may be had, which will be apparent to those skilled in the art.

It is again pointed out that the telescope being rigidly mounted on the supporting bar and the segment being rigidly secured to the bar, the parts are rigidly fastened in adjusted positions by the clamping device. This rigid clamping and association permits the tangent screw 24 to impart a minute adjustment to the parts without the presence of torsional strain, owing to the central disposition of the segment and clamping point and the balancing of the parts, the latter being due to relative location of the horizontal axis.

The foregoing description and illustration clearly express the invention, but it is to be understood that said illustration is merely an exemplification and the invention may be carried out in various other ways.

What I claim, is:

1. In a surveying instrument, the combination with a supporting base, an elongated supporting bar disposed above the base, and a telescope supported by the bar longitudinally thereof and above the latter, of a pair of supporting standards mounted on the base and pivotally supporting the bar and telescope from a point intermediate said bar and telescope, whereby said bar and telescope are substantially balanced.

2. In a surveying instrument, the combination with a supporting base, a supporting bar disposed above the base, and a telescope supported by the bar and above the latter, of a pair of supporting standards mounted on the base and pivotally supporting the bar and telescope from a point intermediate said bar and telescope, whereby said bar and telescope are substantially balanced, and means for fastening the bar and telescope in rigid relation to the supporting base in their adjusted positions.

3. In a surveying instrument, a supporting base, standards mounted on the base, a supporting bar disposed between the standards, and a telescope mounted on the bar longitudinally thereof and thereabove, in combination with a shaft member pivotally supporting the bar and telescope for adjustment in a vertical arc and engaging the standards so that the horizontal pivotal axis lies between the bar and telescope.

4. In a surveying instrument, a supporting base, standards mounted on the base, a supporting bar disposed between the standards, and a telescope mounted on the bar longitudinally thereof and thereabove, in combination with a shaft member pivotally supporting the bar and telescope for adjustment in a vertical arc and engaging the standards so that the horizontal pivotal axis lies between the bar and the telescope, and a fastening device for securing the bar and telescope in rigid relation to the supporting base.

5. In a surveying instrument, a supporting base, standards mounted on the base, a supporting bar disposed between the standards, and a telescope mounted on the bar longitudinally thereof and thereabove, in combination with a shaft member pivotally supporting the bar and telescope for adjustment in a vertical arc and engaging the standards so that the horizontal pivotal axis lies between the bar and the telescope, and a fastening device for securing the bar and telescope in rigid relation to the supporting base, said device being capable of adjustment for adjusting the telescope in a vertical arc after said device has secured said parts.

6. A surveying instrument including a supporting base, an elongated supporting bar pivotally supported on the base, a telescope mounted on the bar longitudinally thereof, a segment rigidly carried by the bar and depending therefrom over the base, and a fastening device carried by the base and engaging the segment.

7. A surveying instrument including a supporting base, a supporting bar pivotally supported on the base, a telescope mounted on the bar, a segment rigidly carried by the bar and depending therefrom over the base, and a fastening and adjusting device carried by the base and including a clamp engaging the segment and a tangential screw member connected with the clamp.

8. In a surveying instrument, a supporting base, spaced standards mounted on the base, a supporting bar pivoted between the standards, a segment depending centrally from the bar and capable of oscillating the bar in a vertical plane, a telescope mounted on the bar, and an adjusting device engaging the segment for oscillating the telescope, bar and segment as a unit.

9. In a surveying instrument, the combination of a supporting plate, a pair of spaced standards mounted on the plate, a horizontal pivot shaft extending between and mounted in the standards, a supporting bar rigidly mounted on the shaft at right angles thereto and depending from said shaft, supports at each end of the supporting bar, a telescope mounted in the end supports of said bar in rigid relation to said bar, a segment depending centrally and longitudinally from the bar and in rigid relation thereto, a fastening device mounted on the supporting plate and arranged to clamp and release the segment, and means for adjusting the device to impart an arcuate movement to the segment to oscillate the telescope in a vertical plane.

10. In a surveying instrument, the combination with a supporting plate, a supporting bar pivoted on the plate, a telescope mounted on the bar, and a segment depending from the bar, of a clamping and tangential adjusting device including a member mounted on the plate, a clamp arranged to engage the segment and mounted on said member, a tangential screw engaging the member, and means for exerting a tension in opposition to the screw.

In testimony whereof I affix my signature.

FRANKLIN S. CLARK.